United States Patent [19]
Spilo et al.

[11] Patent Number: 5,543,822
[45] Date of Patent: Aug. 6, 1996

[54] METHOD FOR INCREASING THE VIDEO THROUGHPUT IN COMPUTER SYSTEMS

[75] Inventors: Michael L. Spilo; Jonathan Daub, both of New York, N.Y.

[73] Assignee: Helix Software Company, Inc., Long Island City, N.Y.

[21] Appl. No.: 69,139

[22] Filed: May 28, 1993

[51] Int. Cl.⁶ ............................................. G09G 1/02
[52] U.S. Cl. ................................... 345/189; 395/165
[58] Field of Search ........................... 345/189, 185, 345/190, 112, 133; 395/115, 164, 162, 165, 166

[56] References Cited

U.S. PATENT DOCUMENTS

| | | | |
|---|---|---|---|
| 4,656,596 | 4/1987 | Thanden et al. | 364/521 |
| 4,777,486 | 10/1988 | Abraham et al. | 345/189 |
| 4,803,476 | 2/1989 | Knapton et al. | 345/189 |
| 5,103,499 | 4/1992 | Miner et al. | 345/189 |
| 5,250,940 | 10/1993 | Valentatem et al. | 345/185 |
| 5,335,322 | 8/1994 | Mattison | 395/164 |
| 8,361,387 | 11/1994 | Millar et al. | 395/164 |

*Primary Examiner*—Richard Hjerpe
*Assistant Examiner*—Doom Chow
*Attorney, Agent, or Firm*—Schweitzer Cornman & Gross

[57] ABSTRACT

A method and system for increasing the throughput of video input and output operations in a computer system is provided. In a memory mapped video environment the preferred embodiment increases the speed of video access by redirecting the video I/O to system RAM and updating the actual memory mapped video asynchronously. Thus full CPU speed is attained in assembling the images, while the screen image is copied to video memory in the background and while the CPU is idle.

3 Claims, 1 Drawing Sheet

METHOD FOR INCREASING THE VIDEO THROUGHPUT IN COMPUTER SYSTEMS

The present invention relates to personal computer systems, and graphics and engineering microprocessor-based workstations. The invention more particularly relates to a software-based method for increasing the efficiency of memory mapped video sub-systems, as may be utilized in such computer systems and workstations.

BACKGROUND OF THE INVENTION

In traditional small computer system design the ability to display graphical images is provided by an adapter or interface card that is connected to the system's central processing unit (CPU) through an I/O bus. The bus serves as the conduit for data into and out of the CPU. Due to limitations in the operational properties of the CPU, the CPU can only directly drive a small number of devices at the same speed as the CPU. Since most I/O operations are substantially slower than the CPU's speed, the I/O bus is generally designed to operate at a lower speed than the CPU. The design speed is further slower than the operational speed for system random access memory (RAM). In today's high-speed machine, CPU speeds of 50 MHz are not uncommon. The video busses, however, typically run at 8 or 16 MHz, substantially slower than that of a fast CPU.

This design limitation is generally not a problem for most devices. However, with the advent of widespread use of graphical user interfaces, such as OS/2 from IBM and Windows from Microsoft, the amount of processing and time expended by the average computer system in creating graphical images has increased dramatically. A number of systems have been developed for increasing the efficiency of this process.

The prevailing methods include co-processing—a method for allowing the CPU to off-load the graphic to a separate processor which is given high-level commands by the system processor and which is then employed to do the bulk processing of the image; and direct memory access (DMA)—a method for allowing the CPU to copy data to the video RAM in a manner that does not require direct CPU supervision. Most recently, the Video Electronics Standards Association (VESA) has introduced a standard high speed I/O bus design (the VL bus) which allows a small number of devices to be directly driven by the CPU at CPU speeds. Video display devices may be driven by the bus.

The drawbacks of all these systems are two-fold: First, the implementation is entirely in hardware, which is costly. Second, these approaches frequently produce less of a real-life performance increase than may be anticipated. The co-processor approach, for instance, increases the speed of creating ordered images, such as lines, arcs and squares, but does nothing for bit-mapped images such as icons and scanned images, which our studies show produce the majority of the graphical overhead in computer systems.

The VL bus approach, although effective for most operations, increases the drain on the CPU, thus increasing the operating temperature of the system and reducing its reliability. The VL bus approach also frequently introduces CPU wait states, which reduce overall system performance. A further, and most significant drawback, of the VL bus is that it requires a completely new system and is thus incompatible with some 96 million PCs in use at the present time.

SUMMARY OF THE INVENTION

It is an object of the present invention to provide an improved system and method for increasing the throughput of an existing video display sub-system to increase the overall performance of a graphically oriented computer system.

It is another object of the present invention to provide such a method which can be embodied in software, whereby the implementation is cost-effective and does not reduce the reliability of the computer hardware.

It is a still further object of the present invention to provide a form of the invention which is appropriate to text-based systems such as the disc operating systems (DOS) provided by IBM and Microsoft.

BRIEF DESCRIPTION OF THE INVENTION

Figure 1:
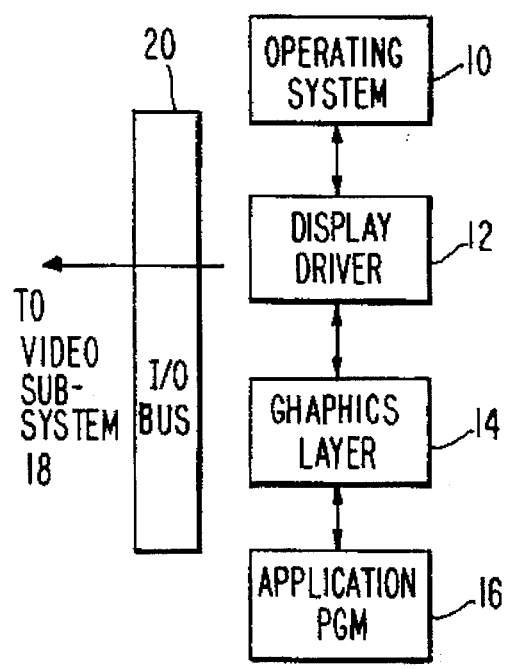
FIG. 1 is a block diagram of conventional video display methodology.

These and other objectives, which will be apparent as the invention is described in greater detail, are obtained by providing an improved method and system for handling video operations. The invention replaces or intercepts the standard video interface between the computer's operating system and the graphical display device. Standard system memory is used to perform the drawing operations, upon a stored image of the display device, which is maintained in system memory in an optimal configuration. The video interface is utilized to update the screen on an intermittent basis, and preferably after sufficient modification to the graphic display has occurred to warrant update. Thus, the speed bottleneck of the interface is significantly decreased. In addition, the form in which the graphical data is maintained in system memory is optimized for fast response.

DETAILED DESCRIPTION OF THE INVENTION

As shown in FIG. 1, the operating system 10 of a conventional personal computer system utilizes a display driver 12 which communicates with the computer operating system 10 to generate the needed information for the display of video data on an appropriate display device such as a CRT. The display driver 12 further communicates with a graphics layer 14 and the application program 16 in preparing and arranging the data for transfer to the video sub-system 18 which includes display memory in which the video data is assembled into a bitmap of the screen. The I/O bus 20 which is utilized between the display driver and the video subsystem is of low speed, typically a small fraction of the speed of the central processing unit of the operation system. This requires the CPU to periodically wait for the bus to "catch up" with the amount of video data made available to it for the display memory by the processing speed of the CPU.

Figure 2:
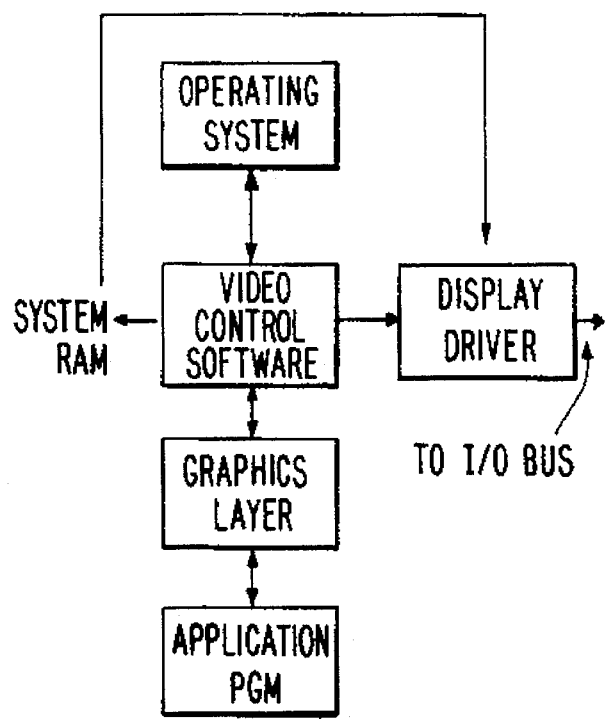
FIG. 2 is a block diagram of the methodology employed in the present invention.
Figure 3:
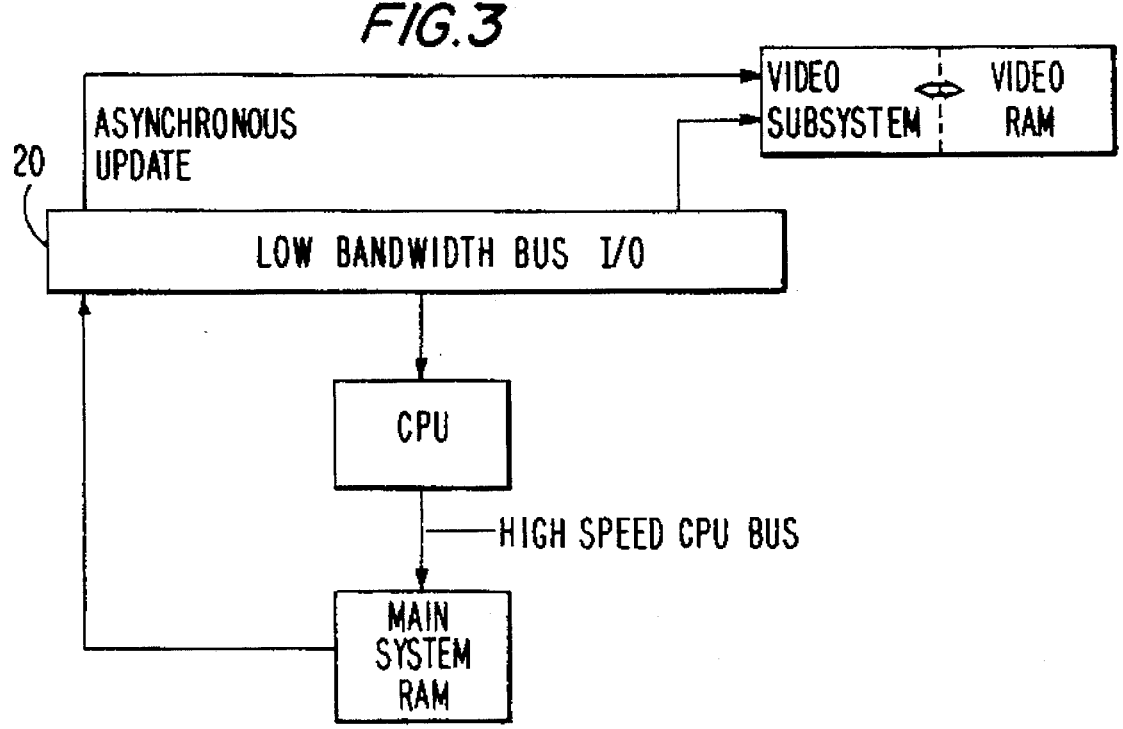
FIG. 3 is a block diagram of the elements of a personal computer system with which the present invention is employed.

As shown in FIG. 2, the present invention provides for communication between the operating system 10 with the display driver 12 through video control software 22, which utilizes a portion of system RAM 24 as an optimized bitmap of the display, utilizing otherwise idle time of the CPU to perform the necessary procedures at high speed. This allows the Ram bitmap to be created and updated substantially faster than the rate available to the conventional display RAM memory for such data passed through the low bandwidth I/O bus to the video subsystem. The software 22 communicates with the graphics layer and application program 16 in place of the display driver 12, which is updated asynchronously as required to maintain proper video operation. As shown in FIG. 3, the video control software of the present invention allows RAM, which is coupled to the CPU by a high-speed bus, to be operated at the speed of CPU 24, to assemble and maintain an optimized video bitmap without the necessity of continuous data passage through the I/O bus. The updates of the video system's memory are performed asynchronously, on an as-required basis, the passage of video data through the I/O bus, and allowing such passage to be conducted efficiently only lessening when needed, resulting in a significant overall boosting of the response speed of the video monitor.

The present invention contemplates the incorporation of a video data processing methodology which is optimized for the computer system in which the invention is implemented. The optimal configuration is dictated by machine architecture. A determination must be made as to what method of accessing main memory allows the maximum number of picture or image elements (pixels) to be drawn with a single machine instruction. On machines which use an instruction set similar to that of Intel's 80386 processor, our studies show that the optimal configuration of a memory buffer established by the present invention for a 16-color display system should map 4 pixel values per data word in a linear fashion so that the lowest value pixel, representing the corner screen location at the beginning of a screen refresh procedure, is located at the lowest order word position. For 256 ($16^2$) color systems the pixels should be mapped 2 per word (4/2) and the like.

The method used to determine the optimal configuration involves comparing the number of CPU clock pulses (i.e. time) and instructions required to modify a single pixel configured in an image memory map organized in each of the following ways:

1. A bitmap composed of consecutive arrays of planes where each plane contains packed pixel data at one pixel per bit. As used herein, the number of planes is equal to the base 2 logarithm of the number of display colors of the video system. A "monochromatic" video system has two colors (e.g. black and white). As recognized in the art, a "bit" is a single binary position. Thus, a bitmap in which a bit represents a pixel requires a number of "planes" equal to the number of colors available, each pixel bit denoting the presence or absence of that color at that pixel position;

2. A bitmap composed of planes where adjacent words contain adjacent planes. Since "words" are strings of bits, a word can embody a greater amount of data than a bit. The words may be configured and arranged such that a word carries multiple color information for a pixel. The words are arranged in a pixel by pixel orientation in the bitmap;

3. A bitmap where each byte represents a complete color data for a given pixel (256 color). Since a byte is a 2-digit hexadecimal data representation, it can carry complete color information for a pixel in a 256 color environment. The bytes are arrayed in a pixel by pixel orientation;

4. A bitmap where each byte of data represents two color coded pixels (16 color). In limited-color systems, one byte can be used to fully define two pixels. They are arrayed in a pixel-pair orientation;

5. A bitmap where each data word represents a single color coded pixel (65,536 colors). In full-color (64 k color) systems, the words are of sufficient length to provide full color data for a single pixel. Again, the words are arrayed in a pixel-by-pixel orientation; and 6. A multi-part bitmap in which one part contains one or more bitmaps for single color access to the pixels and the other is comprised of one of the previous multi-color bitmaps. This structure has value when both monochrome and multi-color video presentations are utilized.

The totality of the data planes fully describe the appearance of the display screen at any time. The data content of the planes must constantly be refreshed to maintain an up-to-date representation of the data to be displayed.

The instruction timing for modifying a single pixel in an array and the instruction time for multi-pixel modification (i.e. the instruction that can modify the most pixels in a single CPU operation) are determined and combined to provide a weighted total figure of merit. The instruction for multi-pixel operation is typically given a weighting factor of 5 (or more) in importance. Our studies have shown that multi-pixel instructions are used about 5 times more often than single-pixel instructions; so the weighting applied reflects this ratio of use. Then the total time required by the instructions required to compute a starting pixel location is computed for single and multi-pixel access. These values are then compared against the same values determined for direct access to the video adapter. The bitmap scheme giving the highest ratio, representing the greatest improvement over direct access, should be used as the format for the RAM interface buffer created.

Once the optimum configuration has been determined, the bitmap is developed in RAM and all video operations are directed to it. The actual video display is then updated by determining what portions of the developed bitmap have been modified (the method for the determination is discussed below) followed by either use of a conventional display driver to update the display memory, or by directly modifying the display memory. Such direct modification can be performed at regular, preferably user-settable, intervals (since the user may have more or less tolerance for sudden changes to large portions of video memory); when there is keyboard or mouse activity; and/or when the system has ceased display activity for a given period of time.

In general, the implementation of the necessary instructions to create the bitmap and intercept video operation can be conducted by one skilled in the art. The following is a particular method, however, developed for the Microsoft Windows system.

Trapping Device Driver Calls Under Microsoft Windows

In a Microsoft Windows or similar operating environment a display device driver is configured which behaves like a completely functional display device driver. Rather than modifying the display hardware, though, this device driver creates the memory based bitmap and loads the existing display device driver as a Windows DLL (Dynamic Link Library) to itself. All graphics calls are thus received by the new device driver, and the video environment appears as being organized in the "optimal configuration" chosen in accordance herewith. This device driver is a software instruction set, able to be programmed by one skilled in the art, and is substituted for the existing driver in the system's System.INI file. By use of the Windows GetProAddress routine, the entry points to the existing driver's drawing and initialization routines can be determined. These entry points are then used by the new driver to access the original driver as required, such as during video update.

Video operations performed by the graphics display interface are stored in the bitmap, and updates to the screen memory are performed asynchronously at intervals and on the occasion of certain events as detailed below. The screen memory may be either modified by the new device driver, or in the case of non-standard display environments, the new driver can call the old driver since it is a DLL of the new driver.

In older-style text oriented systems which do not have a general purpose display driver interface, such as those found on systems running Microsoft DOS, similar results can be obtained by utilizing the mapping and I/O port trapping capability of the CPU. In a preferred embodiment where an Intel 80386-type system is used, Protected Mode operation is used. In this embodiment, the present invention uses the paging capability of the CPU to map system RAM into areas normally occupied by display memory. Application programs then use the faster system RAM for their Video I/O operations. The invention then, using similar methodology, determines when memory has been modified, and makes corresponding modifications to the video memory in a "background" mode as described above.

Determining the Modified Portions for Screen Updates

Ideally, an identification and analysis of each individual pixel should be performed so that only those reflecting a change would be modified in the corresponding display memory. The overhead involved in making such a determination is, however, greater than the optimization it provides. The present invention uses one of two alternative methods, and in some cases both.

The first method involves using memory access hardware of the CPU. In this embodiment, the CPU is the 80386, which provides memory access information in hardware on a 4 k granular basis automatically. This information is used to determine what part of the bitmap has been modified and to make corresponding modifications to the video memory. This degree of "fineness" is generally sufficient. However, a second approach is also advisable and may be used to enhance the performance and the appearance of the screen updates.

The 4 k access map provided by the CPU is linear (i.e., horizontal rather than vertical across the screen image). Thus, if a narrow but vertically long object is drawn, such as a vertical line, the access may indicate that a substantial number of regions have undergone "modification", even though actually only a small portion of the overall bitmap has been modified. Such an access map configuration can be optimized or even completely replaced by maintaining a representation of what we term a "modified rectangle". This is a value containing the lowest and highest x and y (horizontal and vertical) location values that have been modified since the last video update, and provides a more accurate indication of the screen area which has undergone change.

This modified rectangle can be maintained with low overhead by a simple comparison of a drawing region at the start and/or end of each drawing operation for a region with the existing modified rectangle (which at first is nonexistent, i.e. 0, 0, 0, 0) and resetting new values as required. Typically, increases to the drawing area (lessening of the upper bound values and increase of the lower bound values) are recorded and reset when a redraw occurs. This procedure provides sufficient information so that the CPU access map need not be used, or can be used in an "intersect" fashion, allowing the video update of only that region of the video memory that represents the overlap of the 4 k linear regions provided by the CPU and the video area defined by modified rectangle coordinates.

The invention as set forth herein can be implemented by one skilled in the art utilizing known programming and system analysis techniques.

We claim:

1. A method for increasing the performance of a video subsystem having an existing display driver and video RAM in a graphical environment computer system by using standard system RAM as a buffer, comprising the steps of:

A) determining an optimal Bitmap configuration for video screen data;

B) substituting a driver configured for the optimal Bitmap configuration for the existing display driver;

C) causing the substituted driver to allocate main CPU memory for use as the storage site for the determined optimal Bitmap;

D) accepting normal drawing calls from the operating system and reporting to the operating system that the video environment is as dictated by the optimal Bitmap;

E) modifying the optimal Bitmap in accordance with standard instructions received from the operating system so that the bitmap maintains an accurate representation of the display;

F) making repeated determinations at least periodic intervals as to what part of the optimal Bitmap has changed; and G) making corresponding changes to the video display by utilizing the modified bitmap;

wherein the step of determining the optimal Bitmap configuration comprises the steps of:

a) determining the number of CPU cycles required to modify one pixel in a RAM-based bitmap configured in two or more configurations chosen from the following:

i) n arrays of pixels packed 1 per bit, where 2n colors are displayed on a video screen;

ii) one array of packed n-bit pixel data, fully packed into data word format;

iii) one array of data elements, in which full color capability of pixels is arranged on a pixel-by-pixel basis;

iv) one array of pixel data packed 1 pixel per bit, with consecutive data locations containing adjacent plane information;

v) two arrays comprising a first array comprising at least 1 single color array to temporarily hold single color modifications and a second array chosen from array formats i through iv, said second array being updatable from said first array;

b) determining the number of CPU cycles required to modify consecutive multiple pixels in each of said chosen configurations;

c) determining the number of CPU cycles required to compute the offset into the array of a starting point for multiple and single pixel modification operations;

d) calculating a weighting value from the results of steps a, b and c;

e) determining corresponding values for said chosen configurations when direct access to video memory update routine is performed and comparing said corresponding values to said weighting values; and f) identifying as the optimal configuration the one of said chosen configurations having the greatest proportional increase over the value determined in step e.

2. The method of claim 1, wherein the environment is a Microsoft Windows operating environment, wherein said driver substitution step consists of the following steps:

a) substituting a new device driver for the existing device driver in the Windows SYSTEM.INI file;

b) preserving the existing device driver in memory accessible to the new device driver at load time;

c) causing the new driver to issue a standard Windows call to load a DLL (LoadLibrary), whereby the original driver is loaded as a library of the new driver;

d) using the Windows GetProAddress routine to retrieve addresses of entry points to the existing driver's drawing and initialization routines; and e) utilizing the addresses returned to call the existing driver to perform functions needed by the new driver.

3. The method of claim 1, wherein the step of determining what part of the optimal Bitmap has changed comprises of the steps of:

a) retrieving CPU access bits provided by the hardware which identify regions of memory that have been accessed;

b) maintaining a set of coordinates of the upper and lower bounds of memory that have been accessed, said coordinates being determined by the steps of:

i) determining the bound coordinates of a region modified by a request at the initiation thereof;

ii) comparing the respective coordinates of the request with previously maintained coordinates of the upper and lower bounds of accessed memory; and iii) substituting new bounds coordinates for the maintained coordinates if the new coordinates increase the area of accessed memory; and c) computing the intersection of the regions of memory defined by steps a and b and identifying said intersection as the part of the optimal bitmap that has changed.

\* \* \* \* \*